United States Patent Office 3,560,589
Patented Feb. 2, 1971

3,560,589
EPOXY RESIN CONTAINING A VINYL ALKOXY-SILANE-ETHYLENICALLY UNSATURATED ACID ANHYDRIDE COPOLYMER
Yasuhiko Sato, Shiro Gomyo, and Kiyoshi Imai, Gunma-ken, Japan, assignors to Shinetsu Chemical Company, Tokyo, Japan
No Drawing. Filed July 10, 1968, Ser. No. 743,840
Claims priority, application Japan, July 12, 1967, 42/44,856
Int. Cl. C08g 45/04
U.S. Cl. 260—824          9 Claims

ABSTRACT OF THE DISCLOSURE

Compositions which consist of (a) a copolymer prepared by reacting vinylalkoxysilane containing at least one alkoxy group with an ethylenically unsaturated carboxylic acid anhydride, and (b) an epoxy resin or a monomer containing an epoxy group, in the ratio of from 0.2 to 100 parts by weight of (a) to 100 parts by weight of (b).

The invention also includes a process for the production of such compositions. Articles prepared from said epoxy resin compositions have excellent water resistance, mechanical strength and electrical properties, because of the high bonding strength of the epoxy resin contained in the compositions to the inorganic filler added to them.

SUMMARY OF THE INVENTION

This invention relates to epoxy resin compositions and a process for the production of the same.

Epoxy resins are widely used in various fields, in combination with curing agents, fillers and diluents, because of their excellent mechanical and electrical properties, as well as their chemical resistance and dimensional stability. However, epoxy resins have poor affinity to inorganic fillers, such as silica, glass fiber, calcium carbonate, asbestos, mica and the like, and the two components do not adhere to each other very well; molded articles prepared from epoxy resin and inorganic fillers have inferior water resistance. For example, when glass-fiber-reinforced laminates prepared as indicated above are put into boiling water, the epoxy resin and the glass fiber separate, thereby considerably reducing the flexural strength of the products. In order to improve the affinity between the inorganic filler and the synthetic resin and to increase the bonding strength between the two, a compound with a highly functional group in its molecule has been employed as a coupling agent, and several methods have been proposed relating to this matter.

U.S. Pat. No. 2,552,910 illustrates one of the systems wherein use is made of a coupling agent in the form of a chromic (Werner) complex compound having a carboxylate group coordinated with the trivalent nuclear chromium atom in which the carboxylate group is of less than 6 carbon atoms and contains a highly functional group; and U.S. Pat. No. 2,563,288 illustrates another system wherein use is made of a coupling agent in the form of a silane, its hydrolysis products or its polymerization products having at least one of the organic groups attached to the silicon atom containing less than 7 carbon atoms and formed with unsaturated ethylenic bonds. These methods are effective in the case of resinous or polymeric materials, such as unsaturated polyester, polyethylene, polkyalkylacrylate and the like, which are prepared by addition polymerization through an ethylenic group in the monomer, but they are not always effective in improving the bonding strength between epoxy resin and glass fiber.

Other known coupling agents suitable for bonding glass fiber and epoxy resin include organosilanes containing an amino-alkyl group (U.S. Pat. No. 3,252,825), organosilanes containing amide, acid, or acid anhydride groups (Jan. Pat. Pub. No. 38–22,734) and γ - glycidoxypropyltrimethoxysilane, γ - methacryloxypropyltrimethoxysilane, m-trimethoxysilylpropylethylenediamine, and β(3,4-epoxy cyclohexyl)ethyltriethoxysilane. However, in some cases a silane coupling agent as mentioned above reduces the curing rate of the epoxy resin; moreover, the organosilanes mentioned above are prepared by the methods described in U.S. Pats. Nos. 2,823,218, 2,754,311 and 2,930,809, so that the production processes involve complicated operations. It is another shortcoming that the yield rates are low and that the products become very expensive, rendering the industrial use of them as coupling agents very uneconomical.

It is an object of the present invention to provide epoxy resin compositions admixed with a novel coupling agent that will improve the affinity between the epoxy-group-containing compounds and various inorganic fillers, and increase the bonding strength between the two.

Another object of the invention is to provide epoxy resin compositions from which epoxy resin articles can be prepared having excellent flexibility, water-resistance, thermal shock resistance and electrical properties.

Still another object of the invention is to provide epoxy resin compositions which may be processed into laminates, adhesives and paints having the desirable properties indicated above.

Finally, it is an object of the invention to provide a process for the production of epoxy resin compositions having the above-mentioned properties.

The novel compositions of the invention are essentially composed of (a) a copolymer prepared by reacting vinylalkoxysilane, having at least one alkoxy group and represented by the general formula

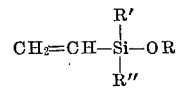

wherein R is selected from the group consisting of hydrogen and an alkyl group having from 1 to 9 carbon atoms, R' and R" are selected from the group consisting of alkyl, aryl, cycloalkyl, alkoxy and hydrogen, with an ethylenically unsaturated carboxylic acid anhydride, and (b) a compound containing an epoxy group in the ratio of from 0.2 to 100 parts by weight of (a):100 parts by weight of (b).

The compositions of this invention yield articles of excellent properties because the alkoxy group directly attached to the Si atom contained in the molecule of the copolymer added to the compositions provides strong affinity to the surface of various fillers, while the acid anhydride group in the above copolymer provides means for attachment of epoxy resin through the chemical reaction of the epoxy group and the acid anhydride group. Thus the copolymer employed in this invention serves both as a coupling agent and a curing agent, so that it takes the greatest effect in articles in which fillers are used, but it may also be employed in the absence of the fillers as a curing agent.

Said copolymer employed in the present invention is prepared by the known method of vinyl-polymerization of vinyl alkoxysilane illustrated by the above general formula with ethylenically unsaturated carboxylic acid anhydride (cf. Industrial and Engineering Chemistry, vol. 45, February 1953, pp. 367–374). Said vinyl alkoxysilane contains at least one alkoxy group in its molecule, as exemplified by vinyltrimethoxysilane, vinyltriethoxysilane, vinyltributoxysilane, vinyl-tris (β-methoxyethoxy) silane, vinylhydroxydiethoxysilane, vinylmethyldiethoxysilane, vinylethyldimethoxysilane, vinylcyclohexyldimethoxysilane, vinylphenyldimethoxysilane, vinyldimethylmonoethoxysilane, vinylmethylphenylmonoethoxysilane, vinylhydrogendiethoxysilane, and the like. In copolymerization, these are employed alone or in mixture of two or more. As the acid anhydride to be copolymerized with them, we may use maleic anhydride, chloromaleic anhydride, citraconic anhydride, itaconic anhydride, aconitic anhydride, and mixtures of these anhydrides.

In carrying out the copolymerization, from 0.2 to 2.0 moles or, preferably, from 0.8 to 1.2 moles of one or more of the acid anhydrides named above are to be added to 1 mole of the vinyl alkoxysilane. The copolymerization easily proceeds in the presence of a proper polymerization initiator and, if necessary, some organic solvent. As the initiator we may use organic peroxides, such as benzoyl peroxide, cumene hydroperoxide, tertiary butyl hydroperoxide and ditertiary butyl peroxide. The quantity of the initiator to be added is preferably from 1 to 3 weight percent of the total of the vinyl alkoxysilane and the acid anhydride. As an organic solvent, acetone, toluene, xylene, methylcellosolve, ethylcellosolve, and cellosolve acetate may be used. The quantity of the organic solvent to be employed is preferably from 20 to 90 weight percent calculated on the total of said vinyl alkoxysilane and acid anhydride.

As mentioned before, known methods are employed for carrying out the copolymerization reaction. For example, the components mentioned above are introduced, together with the polymerization initiator and the solvent, in a reactor equipped with a reflux condenser, and heated at 90–130° C. for 6–10 hours, whereby the product is obtained at the yield rate of over 90%. In order to control the reaction, the polymerization may be carried out while adding dropwise gradually the entire amount of vinyl alkoxysilane and/or acid anhydride into the reactor. The copolymer thus prepared possesses good compatibility with compounds containing an epoxy group, and is soluble in the conventional organic solvents, so that it may be added to epoxy resin either as a solution as it has been prepared, or after the solvent is removed from it, or alternatively, after the solvent is substituted by some diluent suitable for the epoxy-group-containing compound.

The ratio in which the copolymer and the epoxy group-containing compound are to be mixed is from 0.2 to 100 parts by weight or, preferably, from 1 to 10 parts by weight, of the copolymer to 100 parts by weight of the epoxy group-containing compound, namely the monomer containing an epoxy group or the epoxy resins. If the quantity of the copolymer added is less than 0.2 part, the object of the invention can hardly be attained, and if it is over 100 parts, the articles prepared will become brittle, and the excessive alkoxy group remaining in the compositions will impair various properties of the articles made therefrom.

In hardening the resin composition of the invention, conventional curing agents, such as amines, organic acid anhydrides, boric trifluoride, a boric trifluorideamine complex, and dicyan-diamide are used. In this case, proper curing accelerators, stabilizers, pigments and other additives may be added, too.

As epoxy group-containing compounds employed in carrying out the method of the invention, epoxy resins and epoxy group-containing monomers may be given. Said epoxy resins may be a reaction product of bisphenol A (p,p'-dihydroxy diphenyl propane) and epichlorohydrin, or may be a condensation product prepared from a novolak-type phenol resin and epichlorohydrin. The monomer containing epoxy group may be exemplified by glydicylmethacrylate, phenylglydicylether, allylglycidylether, butylglycidylether; 3,4-epoxy-6-methylcyclohexylmethyl 3,4-epoxy 6-methylcyclohexane carboxylate, vinylcyclohexenedioxide, dipentenedioxide, dicyclopentadienedioxide, bis (3,4-epoxy 6-methylcyclohexylmethyl) adipate, vinylcyclohexenemonoxide, 3,4-epoxycyclohexylmethyl 3,4-epoxycyclohexane carboxylate, and the like.

The resin compositions of the invention may be molded by casting, potting, encapsulating, and they may be used as laminates, adhesives, paints and the like.

The invention will now be more fully described by a number of examples, but these are given by way of illustration and not of limitation; many changes and modifications of the details may be made without departing from the spirit of the invention. In the examples, all the parts are parts by weight.

EXAMPLE 1

190 parts of vinyltriethoxysilane, 90 parts of maleic anhydride, and 120 parts of toluene were introduced into a four-necked flask, and 5.6 parts of benzoyl peroxide were added to the mixture. While the temperature was maintained at 90–100° C., the reaction was conducted for 10 hours, yielding a toluene solution containing 70 weight percent of copolymer of vinyl triethoxysilane and maleic anhydride. To 100 parts of epoxy resin (average molecular weight: 355), prepared from epichlorohydrin and bisphenol A, were added 1.43 parts, 4.29 parts and 11.43 parts of the above toluene solution, respectively (epoxy resin:copolymer=100:1, 100:3, and 100:8, respectively), and to each were added 70 parts of methyl-endo-methylene tetrahydrophthalic anhydride as a curing agent, 1 part of tris (dimethylaminomethyl) phenol as a curing accelerator, and 80 parts of acetone as a solvent; subsequently, thorough mixing took place. Heat cleaned glass cloth was impregnated with the mixture solution prepared as indicated above and then the solvent was removed from it by heating. The prepreg material thus prepared was subjected to heat-pressing at 150° C., with a pressure of 20 kg./cm.² for 1 hour, and then at 200° C. for 1 hour. Laminates thus obtained had a flexural strength (ASTM–D–790) and water absorption (ASTM–D–570) as shown in Table 1.

TABLE 1

| | Sample Number | | | |
|---|---|---|---|---|
| | 1 | 2 | 3 | 4 |
| Quantity of copolymer added to epoxy resin, percent | 0 | 1 | 3 | 8 |
| Flexural strength [1], kg./mm.² | 42.2 | 42.3 | 43.5 | 43.8 |
| Flexural strength [2], kg./mm.² | 30.1 | 38.0 | 42.2 | 42.0 |
| Flexural strength [3], kg./mm.² | 19.4 | 33.5 | 41.2 | 40.8 |
| Water absorption [4], percent | 0.145 | 0.137 | 0.125 | 0.103 |
| Water absorption [5], percent | 0.053 | 0.050 | 0.045 | 0.039 |

[1] Standard condition.
[2] After the sample was immersed in boiling water for 16 hours.
[3] After the sample was immersed in boiling water for 48 hours.
[4] After the sample was immersed in boiling water for 1 hour.
[5] After the sample was immersed in water at 25° C. for 24 hours.

The electrical properties of Samples No. 1 and No. 3 above were measured, and the following results were obtained:

TABLE 2

| | Sample Number | | | | |
|---|---|---|---|---|---|
| | 1 | | 3 | | |
| | Quantity of copolymer added to epoxy resin, percent | | | | |
| | 0 | | 3 | | |
| | Standard condition | After being boiled for 48 hours | Standard condition | After being boiled for 48 hours | Testing method |
| Surface resistance ($\Omega$) | $1.1\times10^{14}$ | $2.5\times10^{8}$ | $1.5\times10^{14}$ | $5.0\times10^{11}$ | ASTM-D-257 |
| Volume resistivity ($\Omega$-cm.) | $8.0\times10^{14}$ | $1.5\times10^{9}$ | $9.0\times10^{14}$ | $2.8\times10^{13}$ | ASTM-D-257 |
| Breakdown voltage (kv./mm.) | 19.1 | 8.0 | 20.0 | 18.0 | |
| Dielectric constant | 5.5 | 9.5 | 5.4 | 5.8 | ASTM-D-150 |
| Dielectric loss tangent | 0.03 | 1.75 | 0.02 | 0.03 | ASTM-D-150 |

EXAMPLE 2

To each of the samples prepared by adding to 100 parts of the same epoxy resin as mentioned in Example 1, 1.43 parts, 4.29 parts and 11.43 parts of the toluene solution of Example 1, 60 parts of acetone and 25 parts of 4.4-diaminodiphenylmethane (as a curing agent) were added, and glass fiber cloth was impregnated with each of the mixtures, obtaining—by the method given in Example 1—laminate plates with the properties given in Tables 3 and 4.

TABLE 3

| | Sample Number | | | |
|---|---|---|---|---|
| | 5 | 6 | 7 | 8 |
| Quantity of copolymer added to epoxy, resin, percent | 0 | 1 | 3 | 8 |
| Flexural strength[1], kg./mm.[2] | 44.3 | 43.7 | 44.5 | 45.0 |
| Flexural strength[2], kg./mm.[2] | 25.3 | 42.2 | 43.2 | 43.5 |
| Flexural strength[3], kg./mm.[2] | 23.1 | 38.5 | 39.4 | 40.0 |
| Water absorption[4], percent | 0.145 | 0.113 | 0.082 | 0.080 |
| Water absorption[5], percent | 0.043 | 0.032 | 0.026 | 0.027 |

[1] Standard condition.
[2] After being immersed in boiling water for 16 hours.
[3] After being immersed in boiling water for 48 hours.
[4] After being immersed in boiling water for 1 hour.
[5] After being immersed in water at 25° C. for 24 hours.

TABLE 4

| | Sample Number | | | |
|---|---|---|---|---|
| | 5 | | 7 | |
| | Quantity of copolymer added to epoxy resin, percent | | | |
| | 0 | | 3 | |
| | Standard condition | After being boiled for 48 hours | Standard condition | After being boiled for 48 hours |
| Surface resistance ($\Omega$) | $1.0\times10^{13}$ | $4.3\times10^{7}$ | $7.6\times10^{13}$ | $3.8\times10^{11}$ |
| Volume resistivity ($\Omega$-cm.) | $2.3\times10^{14}$ | $9.0\times10^{8}$ | $3.0\times10^{14}$ | $8.8\times10^{12}$ |
| Breakdown voltage (kv./mm.) | 18.7 | 7.5 | 19.0 | 17.5 |
| Dielectric constant | 5.8 | 10.0 | 5.7 | 6.0 |
| Dielectric loss tangent | 0.04 | 1.78 | 0.03 | 0.05 |

EXAMPLE 3

Toluene solution containing 70 weight percent of copolymer prepared from vinyltriethoxysilane and maleic anhydride as given in Example 1 was subjected to stripping at 60° C. under reduced pressure, and 3 parts of pale yellow resinous solid thus obtained was dissolved in 100 parts of the same epoxy resin as mentioned in Example 1, and to the mixture were further added 100 parts of pulverized silica and 1.5 parts of BF$_3$·monomethyl amine, kneaded at 50–60° C., and then molded to a rod shape of 10 x 5 x 150 mm. at 150° C. for 2 hours.

The molded product was immersed in boiling water for 48 hours, but no change was observed in its appearance, and the reduction in flexural strength was only 10%. On the other hand, the molded product, prepared of all the materials indicated above, but without the resinous copolymer, became white after it was immersed in boiling water and the flexural strength showed a reduction of 50%.

EXAMPLE 4

To 100 parts of epoxy resin given in Example 1 were added 5 parts of the copolymer prepared from vinyltriethoxysilane and maleic anhydride (molecular ratio 1.2:1), 100 parts of pulverized silica, 35 parts of phthalic anhydride (curing agent) and 0.5 part of triethanol amine (curing accelerator), and the mixture was kneaded on a two-roll mill, placed in a mold, and press-heated at 150° C. for 3 hours, obtaining a rod-shaped mold like the one in Example 3. Even after being immersed in boiling water for 48 hours, the product did not show any change in appearance and the flexural strength was reduced by only 10%; however, in the case of another product in which no copolymer as mentioned above was employed, a sample turned white when it was subjected to the same test in boiling water, and the reduction of flexural strength was 50%.

EXAMPLE 5

200 parts of epoxy resin (average molecular weight: 2900) and 100 parts of another epoxy resin (average molecular weight: 900), prepared from epichlorohydrin and bisphenol A, were placed in a mixer and the mixture was melted at 179–180° C. To the melt, 500 parts of pulverized silica were added and after having been well mixed were cooled down to 120° C. Subsequently, 15 parts of dicyandiamide (curing agent) were added to the mixture, and immediately thereafter the mixture was subjected to further stirring; it was taken out, cooled and pulverized, whereby a powder for molding was obtained.

To 200 parts of the powder thus prepared, 7 parts of resinous solid (copolymer) employed in Example 3 were added and the mixture was placed in a mold at 140° C. to be melted, and put under pressure. After the melt was subjected to molding at 180° C., with a pressure of 200 kg./cm.[2] for 1 hour, the product was taken out. The sample thus prepared showed no change in appearance, even after it was placed for 48 hours in boiling water, but another sample prepared just as described above of all the materials, but without the resinous copolymer, became very white when put to the same boiling test.

EXAMPLE 6

112 parts (1 mole) of itaconic anhydride and 80 parts of toluene were placed in a four-necked flask, equipped with a reflux condenser, and were heated while care was taken to maintain the temperature at 110° C. To the contents of the flask a mixture of 178 parts (1.2 moles) of vinyltrimethoxysilane, 40 parts of toluene and 5.8 parts of benzoyl peroxide was added dropwise within the course of 3 hours and at the reaction temperature of 110–115° C. After the mixture had all been added, the contents of the flask were further heated at 115–120° C. for 6 hours in order to carry out the reaction to completion. The product obtained was a pale yellow and transparent solution containing 68% of nonvolatile matter.

7.35 parts of the copolymer thus prepared were added to 70 parts of methyl-endo-methylene tetrahydrophthalic anhydride; the mixture was then distilled under reduced pressure at 60–80° C. to remove the toluene.

The remaining product was added to the mixture of 100 parts of epoxy resin prepared from epichlorohydrin and bisphenol A (average molecular weight 470), 50 parts of pulverized silica (200 mesh), and 2 parts of benzyldimethylamine (curing agent). The mixture was molded at 80° C. for 2 hours and at 150° C. for 3 hours. The product thus obtained had the properties shown in Table 5.

containing at least one alkoxy group and represented by the general formula $$CH_2=CH-\underset{R''}{\underset{|}{\overset{R'}{\overset{|}{Si}}}}-OR$$

wherein R is selected from the group consisting of hydrogen and an alkyl group having from 1 to 9 carbon atoms, R' and R'' are selected from the group consisting of alkyl, aryl, cycloalkyl and alkoxy groups and hydrogen, with (2) 0.2–2 moles of at least one ethylenically unsaturated carboxylic acid anhydride selected from the group consisting of maleic anhydride, chloromaleic anhydride, citraconic anhydride, itaconic anhydride, and aconitic anhydride, and (b) 100 parts by weight of epoxy resin, which is a reaction product of bisphenol A and epichlorohydrin.

5. The compositions according to claim 4, wherein said vinyl alkoxysilane is selected from the group consisting of vinyl trimethoxysilane, vinyl triethoxysilane, vinyl tributoxysilane, vinyl tris (methoxy ethoxy) silane,

| | Sample Number | | | | |
|---|---|---|---|---|---|
| | 1 | | 3 | | |
| | Quantity of copolymer added to epoxy resin, percent | | | | |
| | 0 | | 3 | | |
| | Standard condition | After being boiled for 48 hours | Standard condition | After being boiled for 48 hours | Testing method |
| Flexural strength, kg./mm $^2$ | 8.5 | 5.5 | 11.0 | 9.8 | ASTM-D-790 |
| Deflection temperature, ° C | 130 | | 135 | | ASTM-D-648 |
| Tensile strength, kg./mm $^2$ | 5.5 | 4.0 | 7.0 | 6.5 | ASTM-D-651 |
| Volume resistivity, Ω-cm | 6.5×10$^{15}$ | 5.0×10$^{11}$ | 7.2×10$^{15}$ | 2.3×10$^{14}$ | ASTM-D-257 |

What is claimed is:

1. Epoxy resin compositions consisting of (a) a copolymer prepared by reacting (1) one mole of a vinyl alkoxysilane, containing at least one alkoxy group in its molecule and represented by the general formula $$CH_2=CH-\underset{R''}{\underset{|}{\overset{R'}{\overset{|}{Si}}}}-OR$$

wherein R is selected from the group consisting of hydrogen and an alkyl group having from 1 to 9 carbon atoms, R' and R'' are selected from the group consisting of alkyl, aryl, cycloalkyl and alkoxy groups and hydrogen, with (2) 0.2–2 moles of at least one ethylenically unsaturated carboxylic acid anhydride selected from the group consisting of maleic anhydride, chloromaleic anhydride, citraconic anhydride, itaconic anhydride, and aconitic anhydride, and (b) an epoxy resin selected from the group consisting of the reaction product of bisphenol A and epichlorohydrin, and a condensation product prepared from a novolac-type phenol resin and epichlorohydrin, wherein (a) and (b) are in the ratio of 0.2–100 parts by weight:100 parts by weight.

2. Epoxy resin composition according to claim 1, wherein (a) and (b) are in the ratio of 1–10 parts by weight:100 parts by weight.

3. The compositions according to claim 1, wherein said vinyl alkoxysilane is selected from the group consisting of vinyl trimethoxysilane, vinyl triethoxysilane, vinyl tributoxysilane, vinyl tris (β-methoxy ethoxy) silane, vinyl hydroxydiethoxysilane, vinyl methyldiethoxysilane, vinyl ethyldiethoxysilane, vinyl cyclohexyldimethoxy vinyl phenyldimethoxysilane, vinyl dimethyl monoethoxysilane, vinyl methylphenyl monoethoxysilane, vinyl hydrogendiethoxysilane, and mixtures thereof.

4. Epoxy resin compositions according to claim 2, consisting of (a) 1–10 parts by weight of copolymer prepared by reacting (1) one mole of vinyl alkoxysilane, vinyl hydroxydiethoxysilane, vinyl methyldiethoxysilane, vinyl ethyldiethoxysilane, vinyl ethyldimethoxysilane, vinyl cyclohexyldimethoxysilane, vinyl phenyldimethoxysilane, vinyl dimethyl monoethoxysilane, vinyl methylphenyl monoethoxysilane, vinyl hydrogenediethoxysilane, and mixtures thereof.

6. Epoxy resin composition, according to claim 2, consisting of (a) 1–10 parts by weight of a copolymer prepared by reacting (1) one mole of vinyl alkoxysilane selected from the group consisting of vinyl trimethoxysilane and vinyl triethoxysilane with (2) 0.8–1.2 moles of ethylenically unsaturated carboxylic acid anhydride selected from the group consisting of maleic anhydride and itaconic anhydride, and (b) 100 parts by weight of epoxy resin, which is a reaction product of bisphenol A and epichlorohydrin.

7. The composition according to claim 1, wherein the copolymer consists of vinyltriethoxysilane condensed with maleic anhydride, and the epoxy group-containing compound is the reaction product of bisphenol A and epichlorohydrin.

8. A process for the production of epoxy resin compositions comprising (1) copolymerizing (a) one mole of vinyl alkoxysilane containing at least one alkoxy group in its molecule and represented by the general formula $$CH_2=CH-\underset{R''}{\underset{|}{\overset{R'}{\overset{|}{Si}}}}-OR$$

wherein R is selected from the group consisting of hydrogen and an alkyl group having from 1 to 9 carbon atoms, R' and R'' are selected from the group consisting of alkyl, aryl, cycloalkyl and alkoxy groups and hydrogen, with (b) 0.2–2 moles of an ethylenically unsaturated carboxylic acid anhydride, selected from the group consisting of maleic anhydride, chloromaleic anhydride, citraconic anhydride, itaconic anhydride, and aconitic anhydride, in the presence of an organic peroxide and an organic solvent, and (2) mixing 1–10 parts by weight of the copolymer obtained, with 100 parts by weight of epoxy resin, which is a reaction product of bisphenol A and epichlorohydrin.

9. A process for the production of epoxy resin compositions, according to claim 8, comprising (1) copolymerizing (a) one mole of vinyl alkoxy silane selected from the group consisting of vinyl trimethoxysilane and vinyltriethoxysilane, with (b) 0.8–1.2 moles of ethylenically unsaturated carboxylic acid anhydride selected from the group consisting of maleic anhydride and itaconic anhydride, in the presence of an organic peroxide in an amount of 1 to 3% by total weight of said (a) and (b), and an organic solvent in an amount of 20 to 90% by total weight of said (a) and (b), at the temperature of 90 to 130° C., for 6 to 10 hours, and (2) mixing 1–10 parts by weight of the copolymer obtained, with 100 parts by weight of epoxy resin, which is a reaction product of bisphenol A and epichlorohydrin.

References Cited

UNITED STATES PATENTS

| | | | |
|---|---|---|---|
| 2,798,020 | 7/1957 | Balz et al. | 260—827 |
| 3,170,962 | 2/1965 | Tyler | 260—824 |
| 3,271,476 | 9/1966 | Widmer et al. | 260—824 |
| 3,346,443 | 10/1967 | Elmer | 260—827 |
| 3,387,061 | 6/1968 | Smith et al. | 260—824 |

OTHER REFERENCES

Wagner et al.: Industrial and Engineering Chemistry, vol. 45, No. 2 (February 1953), pp. 367–374.

SAMUEL H. BLECH, Primary Examiner

U.S. Cl. X.R.

117—126; 161—185; 260—32.8; 33.6, 41, 78.5, 826, 827